United States Patent
Kim et al.

(10) Patent No.: US 9,035,601 B2
(45) Date of Patent: May 19, 2015

(54) WIRELESS POWER TRANSFER SYSTEM AND METHODS

(75) Inventors: Dukhyun Kim, Marietta, GA (US); Yun Ho Lee, Alpharetta, GA (US); Youngsik Hur, Alpharetta, GA (US)

(73) Assignee: SAMSUNG ELECTRO-MECHANICS, Gyunngi-Do (KR)

( * ) Notice: Subject to any disclaimer, the term of this patent is extended or adjusted under 35 U.S.C. 154(b) by 512 days.

(21) Appl. No.: 13/357,879

(22) Filed: Jan. 25, 2012

(65) Prior Publication Data
US 2012/0280650 A1    Nov. 8, 2012

Related U.S. Application Data

(60) Provisional application No. 61/482,676, filed on May 5, 2011.

(51) Int. Cl.
*H02J 7/00* (2006.01)
*H02J 17/00* (2006.01)

(52) U.S. Cl.
CPC ...................................... *H02J 17/00* (2013.01)

(58) Field of Classification Search
USPC ........................................................ 320/108
See application file for complete search history.

(56) References Cited

U.S. PATENT DOCUMENTS

| 7,605,496 | B2 * | 10/2009 | Stevens et al. | 307/17 |
| 2009/0096413 | A1 * | 4/2009 | Partovi et al. | 320/108 |
| 2010/0253281 | A1 * | 10/2010 | Li | 320/108 |

* cited by examiner

*Primary Examiner* — Samuel Berhanu

(57) ABSTRACT

Systems and methods pertaining to wireless power transfer are disclosed. In one implementation, a system includes a wireless charger that is used to charge at least one wirelessly chargeable device. The wireless charger includes a master communication system and at least one wireless power charge transmitter, while the wirelessly chargeable device includes a slave wireless communication system configured at least in part, for communicating with the master wireless communication system in order to execute a wireless power charging operation. The wirelessly chargeable device further includes a wireless power charge receiver configured to receive a wireless power charge from the wireless power charge transmitter contained in the wireless charger.

14 Claims, 9 Drawing Sheets

WIRELESS POWER TRANSFER SYSTEM AND METHODS

RELATED APPLICATION

The present application claims priority to U.S. Provisional Patent Application No. 61/482,676, filed May 5, 2011, and entitled "WIRELESS POWER TRANSFER SYSTEM AND METHOD WITH MULTIPLE TRANSMITTERS AND MULTIPLE RECEIVERS," which is hereby incorporated in its entirety as if fully set forth herein.

DESCRIPTION OF THE RELATED ART

A rechargeable battery contained inside a device may be charged in at least two different ways depending on the circuitry provided in the device.

In the first approach, the rechargeable battery may be charged by connecting a power cable to the device and providing a charging current derived from a fixed power source such as an electrical wall outlet. This approach provides several advantages such as for example, a predictable charging environment in which the charging voltage level and current level can be specifically selected to be compatible to the device, and whereby the device can be charged to a known level within a predictable period of time.

However, this first approach suffers from some handicaps as well. As one example of a handicap, it can be appreciated that in some situations it may be inconvenient to charge multiple devices at the same time because of an insufficient number of electrical wall outlets available for use.

In a further example of a handicap, it can be understood that, in existing practice, various devices typically require different charging voltages and different charging currents. This problem has been often addressed by using customized charging devices such as battery eliminators and voltage converters. However, as can be appreciated using such customized charging device leads to various cost penalties associated with design, manufacture, and distribution.

In an alternative approach to charging a rechargeable battery, a device containing a rechargeable battery may be charged wirelessly by placing the device in proximity to a wireless-charging element. Charge transfer from the wireless-charging element to the rechargeable battery may be implemented in several different ways, for example, by using an inductive charge coupling mechanism or a capacitive charge coupling mechanism. The wireless charging approach provides several benefits such as for example, allowing multiple devices to be charged simultaneously. In one case, this may be carried out by placing the multiple devices upon a charging mat.

However, the wireless approach also suffers from certain handicaps. For example, when carrying out simultaneous charging of multiple devices, each of the multiple devices is constrained to be compatible with the power charging level provided by the charging element. Furthermore, the power level provided to the individual devices cannot be conveniently modified for accommodating differing charging rates and charge levels.

SUMMARY

According to a first aspect of the disclosure, a system includes a wireless charger and at least one wirelessly chargeable device. The wireless charger includes a master communication system and at least one wireless power charge transmitter. The wirelessly chargeable device includes a first slave wireless communication system configured at least in part, for communicating with the master wireless communication system in order to execute a wireless power charging operation, and further includes a wireless power charge receiver configured to receive a wireless power charge from the first wireless power charge transmitter.

According to a second aspect of the disclosure, a method includes operating a wireless charger in a discovery mode for discovering at least one wirelessly chargeable device; transitioning from the discovery mode to a device activation charge mode; and then transitioning from the device activation charge mode to a load supporting charge mode.

According to a third aspect of the disclosure, a method includes executing a discovery mode of operation to discover a first wirelessly chargeable device; using a default frequency to provide a first wireless charge to the first wirelessly chargeable device, the power level of the first wireless charge selected for placing the first wirelessly chargeable device in an activated state; and switching from the default frequency to a first frequency for providing a second wireless charge to the first wirelessly chargeable device, the power level of the second wireless charge selected for enabling the first wirelessly chargeable device to transition from the activated state to a load supporting state.

Further aspects of the disclosure are shown in the specification, drawings and claims below.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts, or descriptively similar parts, throughout the several views and embodiments.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as power, voltage, current, power transfer, chargeable, rechargeable, charging, and coupling are used herein as a matter of convenience for description purposes and should not be interpreted in a limiting manner. The phrase "power transfer" may be interchangeably referred to herein as "wireless charging." Also, the term "chargeable" may be used interchangeably with the term "rechargeable" as a matter of convenience. One of ordinary skill in the art will recognize that the phrase "charging a battery" may be alternatively referred to as "recharging the battery." Hence, the various phrases and terms used herein should be interpreted solely to understand the invention rather than to limit the scope of the concept.

It must also be understood that the word "example" as used herein (in whatever context) is intended to be non-exclusionary and non-limiting in nature. Specifically, the word "exemplary" indicates one among several examples, and it must be understood that no special emphasis is intended or suggested for that particular example. A person of ordinary skill in the art will understand the principles described herein and recognize that these principles can be applied to a wide variety of applications using a wide variety of physical elements.

The various embodiments generally describe systems and methods related to wireless power transfer. In particular, described herein are some systems and methods pertaining to wireless power transfer from a charger to one or more chargeable devices.

Figure 1:
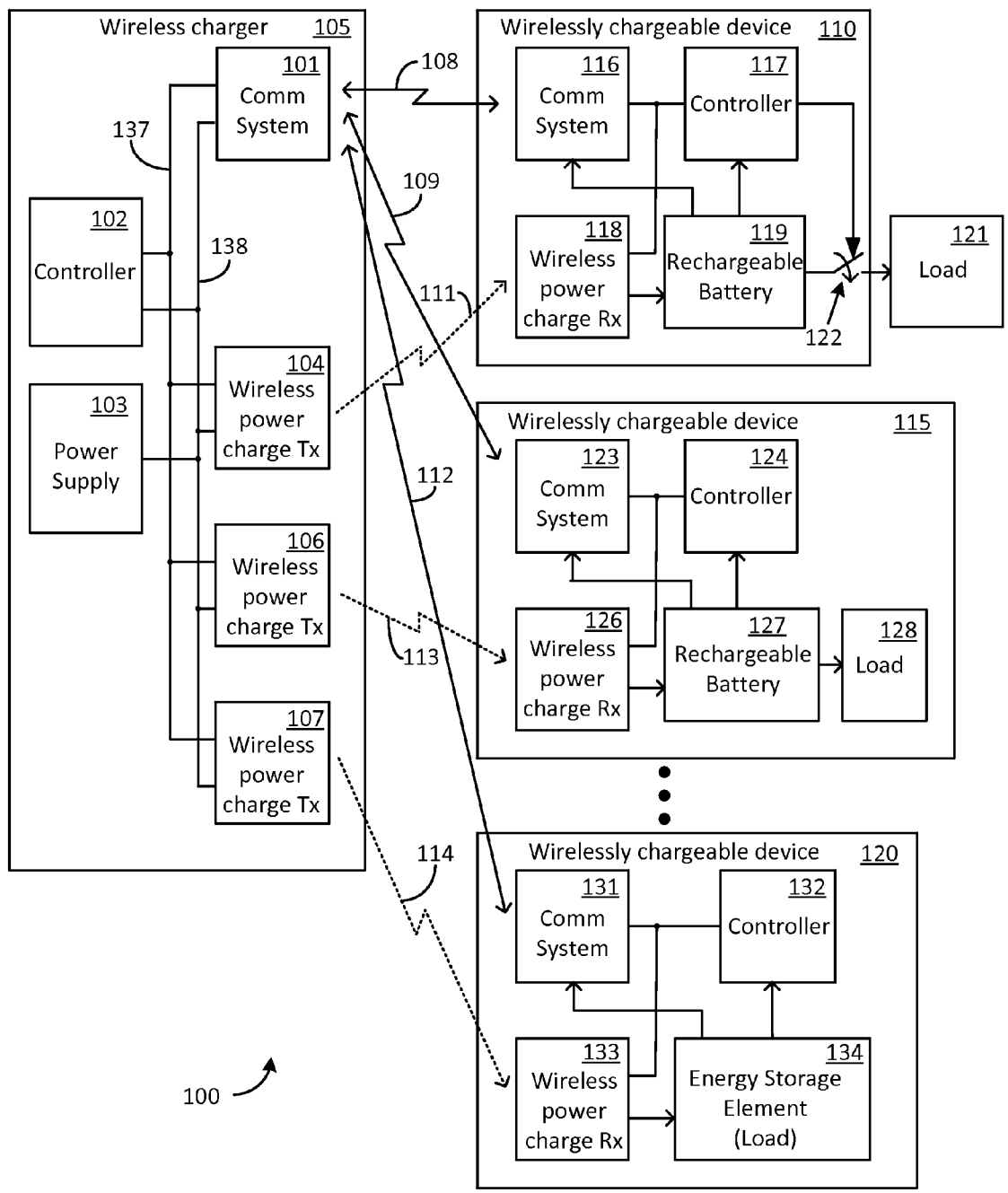
FIG. 1 shows a wireless power transfer system that includes a wireless charger providing power to a plurality of wirelessly chargeable devices in accordance with invention.

Attention is now drawn to FIG. 1, which shows a wireless power transfer system 100 in accordance with invention. Wireless power transfer system 100 includes a wireless charger 105 that is used to communicate with multiple wireless chargeable devices, and to provide power for charging one or more rechargeable batteries contained in each of the wireless chargeable devices.

While the exemplary embodiment shown in FIG. 1 indicates wireless charger 105 as being used to charge multiple wireless chargeable devices, in other embodiments, wireless charger 105 may be used to charge a single wireless chargeable device. The various wireless chargeable devices may be similar to one another (such as for example, wireless chargeable devices 110 and 115) or may be different from one another (such as for example, wireless chargeable devices 110 and 120). These aspects will be addressed below in further detail. It should be noted that in several instances, the description below refers to wirelessly chargeable device 110. However, it will be understood that this has been done solely for purposes of convenience, and the description may be equally applicable to the other wirelessly chargeable devices as well.

Wireless charger 105 includes a wireless communication system 101, a controller 102, a power supply 103 and multiple wireless power charge transmitters. Controller 102 is communicatively coupled via a communication bus 137 to wireless communication system 101 and to each of the wireless power charge transmitters. Power supply 103, which may be powered from an AC mains source and may include batteries, is coupled via a power bus 138 to controller 102, wireless communication system 101 and each of the wireless power charge transmitters.

Wireless chargeable device 110 includes a communication system 116, a controller 117, a rechargeable battery 119, a wireless power charge receiver 118, and a switch 122 that may be used to selectively couple rechargeable battery 119 to a load 121. Controller 117 is communicatively coupled to wireless communication system 116 and wireless power charge receiver 118 to provide control and communication functionality. Wireless power charge receiver 118 includes suitable circuitry to receive a power charge. Such circuitry may include a receiving element (not shown) for receiving the power transmitted from wireless charger 105. The receiving element may incorporate inductive power coupling and/or capacitive power coupling techniques. The received power charge is provided to rechargeable battery 119, which in turn provides power to load 121 and to various elements contained in wireless chargeable device 110. Controller 117 may provide a switch activation signal that is used to operate switch 122. The switch operation will be described below in further detail using other figures.

It will be understood that load 121 is a symbolic representation of any circuitry that draws power from rechargeable battery 119. In a first embodiment as shown in wirelessly chargeable device 110, load 121 may be controllably, or manually, disconnected from rechargeable battery 119, for example when rechargeable battery 119 is being charged. As one example of this first embodiment, load 121 may be a cordless drill that is manually detachable from a battery module (i.e. wirelessly chargeable device 110).

In a second embodiment as shown in wirelessly chargeable device 115, load 128 remains connected to rechargeable battery 127 all the time. As one example of this second embodiment, load 121 may be the various parts (circuitry, speaker, display, etc) of a cellular phone with rechargeable battery 127 located inside the cellular phone enclosure. As can be understood, rechargeable battery 127 is normally not removed from the cellular phone enclosure for purposes of charging.

In a third embodiment as shown in wirelessly chargeable device 120, load 134 is an energy storage element (instead of a battery) that may incorporate various energy storage components such as, for example, capacitors and inductors. The energy stored in the energy storage element may be subsequently used to power various elements such as controller 132 and wireless communication system 131.

Operational aspects of wireless power transfer system 100 will now be explained. Communications system 101, which may be referred to herein as master wireless communication system 101, wirelessly communicates with the communication systems contained in each of the wirelessly chargeable devices. The wireless communication systems contained in each of the wirelessly chargeable devices may be referred to herein as slave wireless communication systems. As shown, master wireless communication system 101 communicates with wireless slave communication system 116 via communication link 108; with wireless slave communication system 123 via communication link 109; and with wireless slave communication system 131 via communication link 112.

Master wireless communication system 101 is configured to communicate with the slave wireless communication systems using various communication protocols. In one exemplary embodiment, near field communications (NFC) techniques are used. NFC techniques are particularly advantageous for implementing a mode of operation referred to herein as a discovery mode of operation. During the discovery mode of operation, master wireless communications system 101 detects the presence of one or more wirelessly chargeable devices that are located in the proximity of wireless charger 105. The discovery mode of operation is described below in further detail using another figure.

Upon discovering a wirelessly chargeable device, master wireless communication system 101 establishes communication with the slave wireless communication system located in the wirelessly chargeable device. The communication protocol used for this purpose is selected to accommodate multiple, and in some cases simultaneous, communications interaction between master wireless communication system 101 and the various slave wireless communication systems.

Once communication is established, a tracking mode of operation may be employed optionally whereby master wireless communication system 101 continuously or intermittently ascertains the presence of one or more wirelessly chargeable device.

The discovery mode and/or the tracking mode of operation is followed by a wireless power transfer mode of operation whereby wireless charger 105 provides power for charging one or more of the rechargeable batteries located in one or more of the wirelessly chargeable devices. This process is carried out by transmitting power from individual wireless power charge transmitters located in wireless charger 105 to corresponding wireless power charge receivers located in the wirelessly chargeable devices.

Specifically, wireless power charge transmitter 104 transfers power into wireless power charge receiver 118 using a suitable charge coupling circuit (not shown) that is specifically designed to accommodate power transfer at selected frequencies. In one exemplary embodiment, a default frequency is used to initially transfer a certain amount of power, after which the frequency may be changed to specifically provide power transfer to wireless power charge receiver 118 without interfering with any power transfer being carried out to any of the other wireless power charge receivers.

Thus, in one scenario, each of power transfer links 111, 113 and 114 may be configured during one period of time to simultaneously transfer power at the default frequency, but may be subsequently reconfigured to transfer power at other individual frequencies. When subsequently reconfigured, the frequency used on power transfer link 111 may be different from that used on power transfer link 113, thereby eliminating/reducing interference between the power transfer processes carried out over the two power transfer links. The frequency reconfiguration may be carried out by incorporating various elements (not shown) such as variable capacitors, variable inductors, and switches in the wireless power charge transmitters and receivers.

In certain embodiments, the default conditions and/or values of these elements may be selected so as to permit power transfer at the default frequency. For example, when no power is available in wirelessly chargeable device 110, the default condition of a switch and/or a default value of a variable capacitor located in a receiving element of wireless power charge receiver 118 may be selected so as to accommodate power transfer at the default frequency from wireless power charge transmitter 104 to wireless power charge receiver 118.

Figure 2:
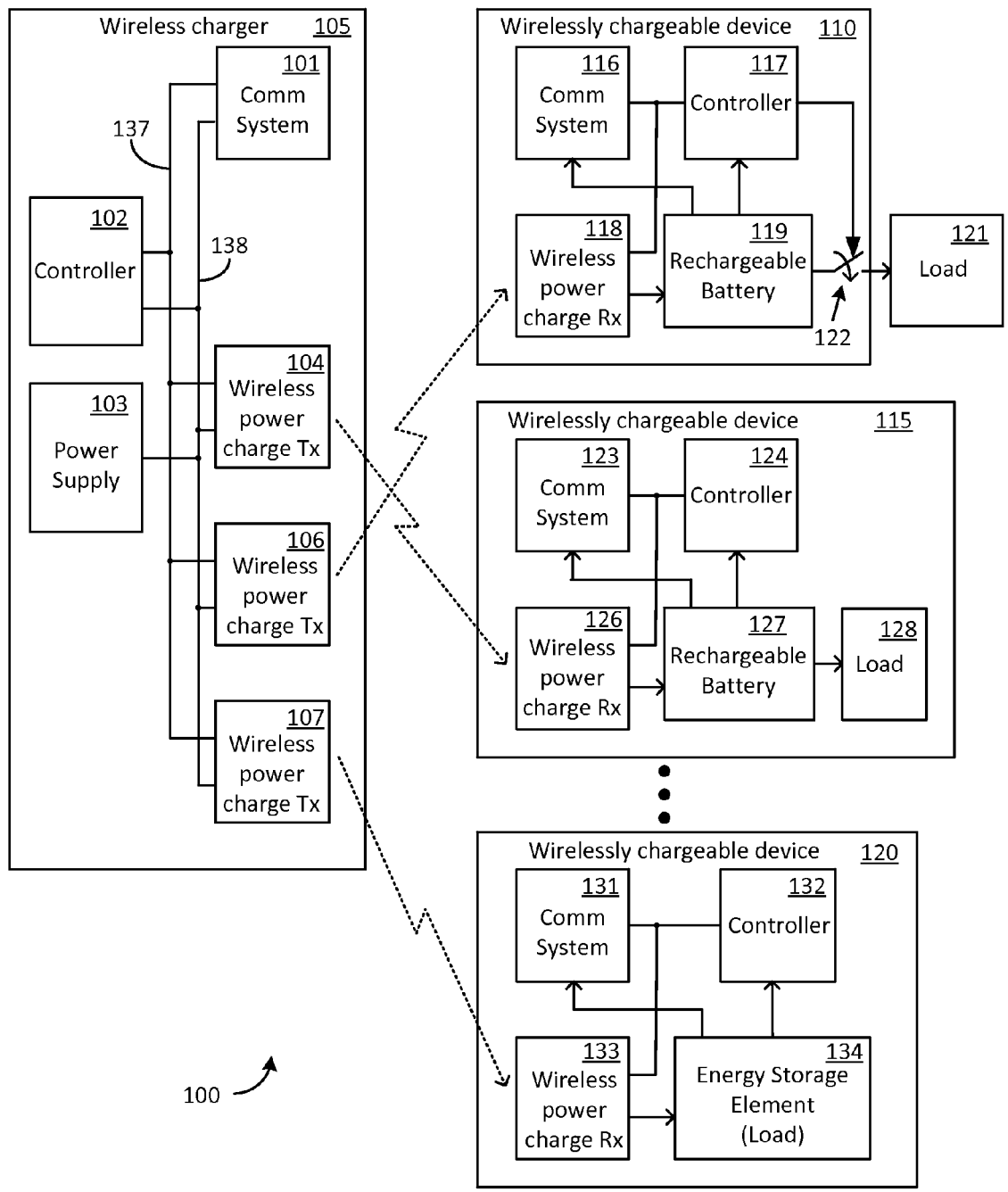
FIG. 2 shows a variation of a power transfer method implemented on the wireless power transfer system shown in FIG. 1.

Attention is now drawn to FIG. 2, which shows a variation of a power transfer method implemented on wireless power transfer system 100. In this method, the roles of two or more wireless power charge transmitters are modified. As one example, of such a modification, wireless power charge transmitter 104 that was previously transferring power to wireless power charge receiver 118 is reconfigured to transfer power to wireless power charge receiver 126 instead. This modification may be carried out for various reasons.

Figure 3:
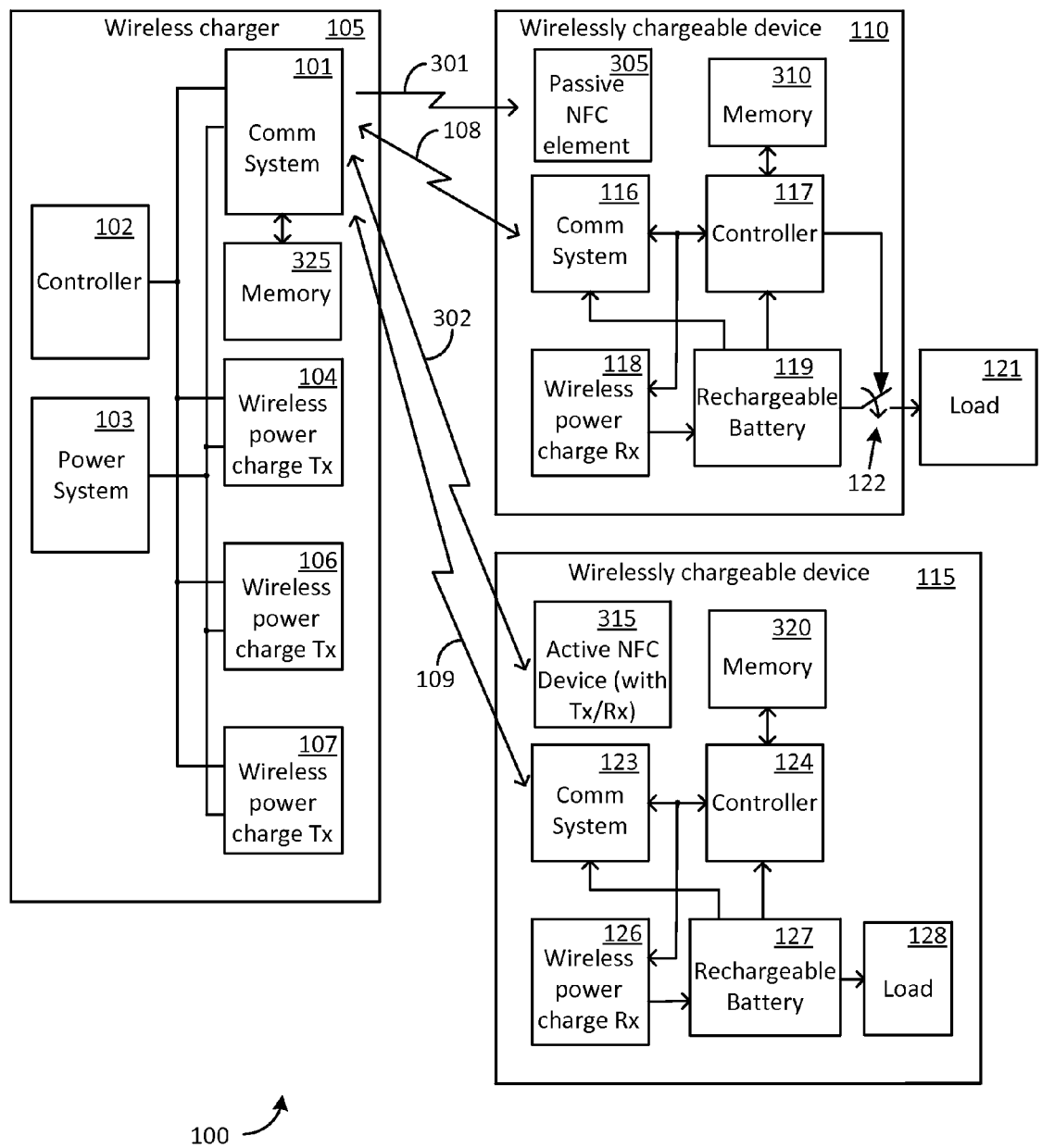
FIG. 3 shows a few exemplary elements that may be incorporated into wireless chargeable devices in accordance with invention.

FIG. 3 shows a few exemplary elements that may be also included in wirelessly chargeable devices in accordance with invention. For example, in a first implementation, a passive NFC element 305, such as an NFC tag, may be incorporated into wirelessly chargeable device 110. Master communication system 101 may use passive NFC element 305 (via link 301) for certain purposes. For example, when there is no power present in wirelessly chargeable device 110 (a dead cellular phone, for example), master communication system 101 detects passive NFC element 305 during the discovery mode of operation and then transfers an adequate amount of power to wirelessly chargeable device 110 so as to enable communication between master communication system 101 and slave communication system 116 via communication link 108 thereafter.

In another implementation, an active NFC device 315 may be incorporated into a wirelessly chargeable device, such as wirelessly chargeable device 115. NFC device 315 includes a transceiver that accommodates bi-directional communications with master communication system 101 via communication link 302. Here again, NFC device 315 may be used by master communication system 101 during the discovery mode of operation, after which master communication system 101 communicates with slave communication system 123 via communication link 109.

In yet another implementation, a single communication link may be used for both discovery mode of operation as well as subsequent operations. The single communication link may be used not only for communications between master communication system 101 and slave communication system 123, but for communications between master communication system 101 and active NFC device 315 as well.

Attention is now drawn to memory 325, which is located in master communication system 101. Memory 325 is coupled to master communication system 101 so as to enable master communication system 101 to store and access various types of data, such as, for example, power level data, frequency data and messaging data. In a similar manner, memory 310 located in wirelessly chargeable device 110; and memory 320 located in wirelessly chargeable device 115; are used to store and provide various types of data to their respective controllers 117 and 124.

Figure 4A:
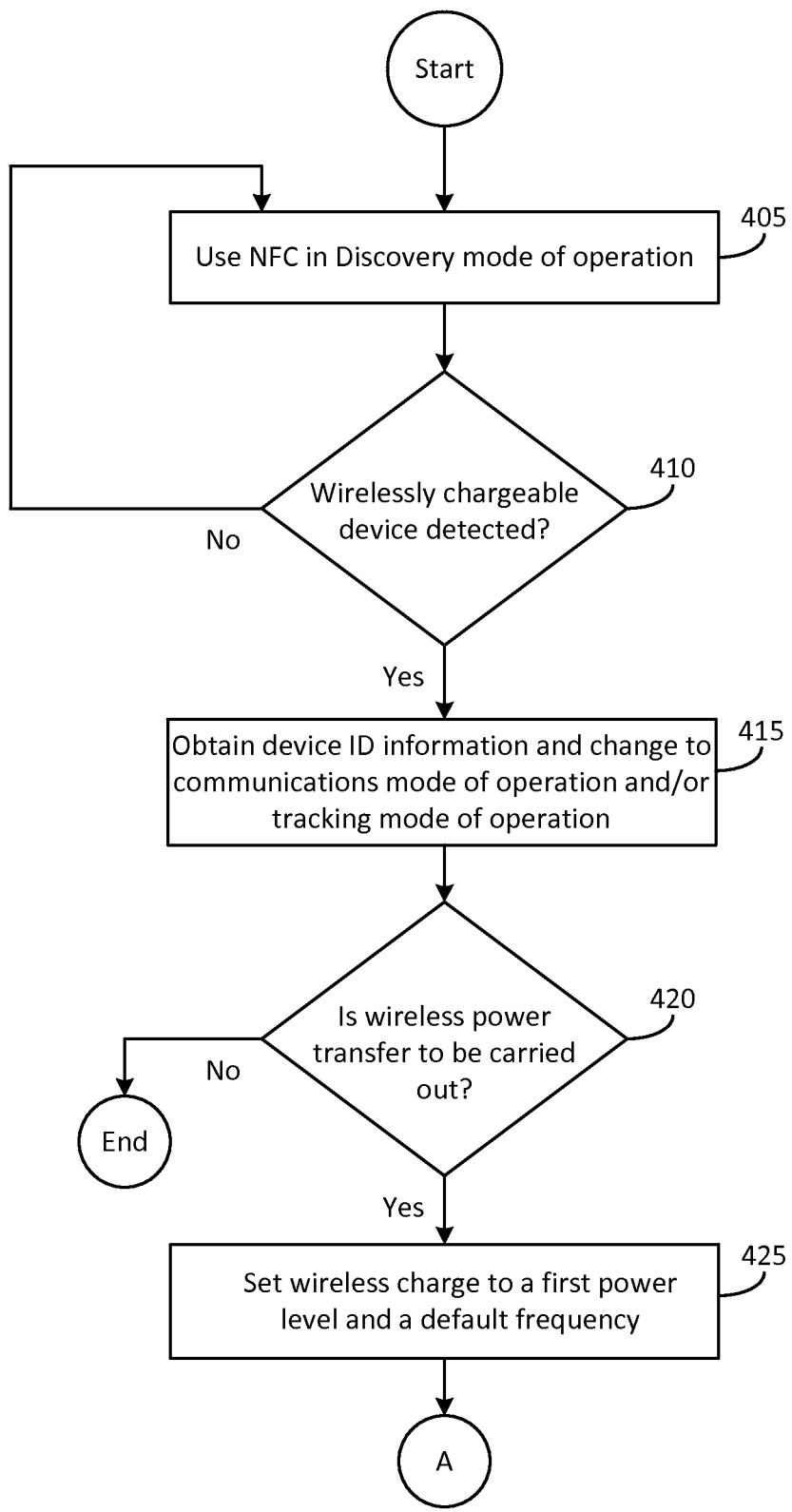
FIGS. 4A, 4B and 4C show a flowchart for a first method for wireless power transfer from a wireless charger to one or more wirelessly chargeable devices.
Figure 4B:
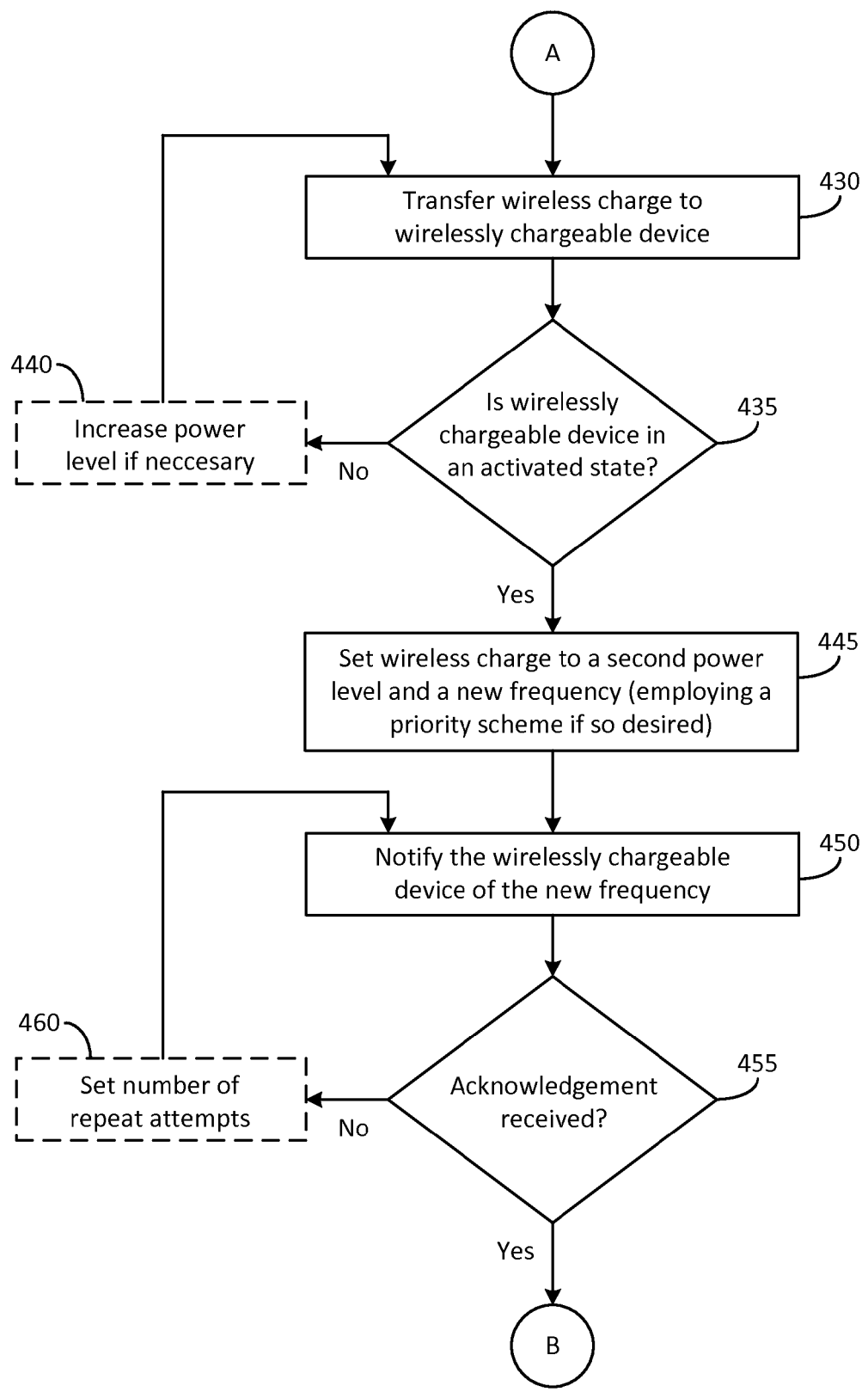
Figure 4C:
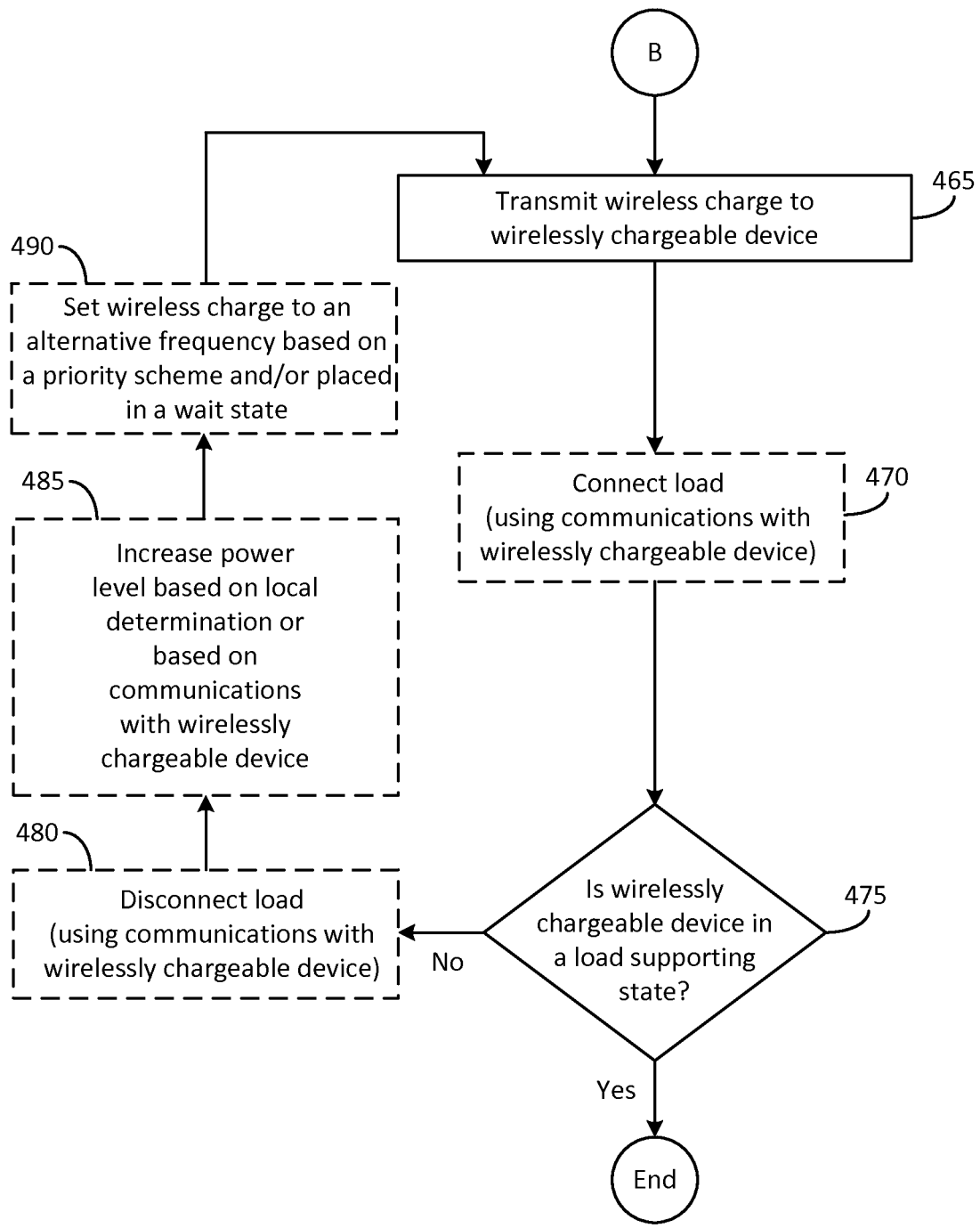

FIGS. 4A-C show a flowchart for a first method for wireless power transfer from a wireless charger to a wirelessly chargeable device. It is to be understood that any method steps or blocks shown in FIGS. 4A-C (as well as FIGS. 5A-C) may represent modules, segments, or portions of code that include one or more executable instructions for implementing specific logical functions or steps in the method. In certain implementations, one or more of the steps may be performed manually. It will be appreciated that, although particular example method steps are described below, additional steps or alternative steps may be utilized in various implementations without detracting from the spirit of the invention. Moreover, steps may be executed out of order from that shown or discussed, including substantially concurrently or in reverse order, depending on various alternative implementations. Code may be also contained in one or more devices, and may not be necessarily confined to any particular type of device. The explanation below, while possibly implying code residency and functionality in certain devices, does so solely for the purposes of explaining concepts behind the invention, and should not be construed in a limiting manner.

Furthermore, certain operations are indicated in FIGS. 4A-C (as well as FIGS. 5A-C) inside dashed blocks. It will be understood that the dashed blocks may be used in certain implementations and omitted in others.

Turning now to FIG. 4A, in block 405, wireless charger 105 is placed in a discovery mode of operation that utilizes NFC to detect a passive and/or an active NFC device that may be located in a wireless chargeable device. In block 410, a determination is made whether a wireless chargeable device has been detected or not. If no device is detected, the functionality of block 405 is reiterated together with block 410 as a recursive loop. On the other hand, if a device is detected, the functionality of block 415 is implemented.

For purposes of description, let it be assumed that wirelessly chargeable device 110, which incorporates passive NFC element 305, is detected. Consequently, in block 415, master communication system 101 acquires device identification (ID) information from passive NFC element 305. (Alternatively, if wirelessly chargeable device 115, which incorporates active NFC device 315, is detected, master communication system 101 acquires device ID information from active NFC device 315 via a process of interactive bi-directional communication between master communication system 101 and NFC device 315.)

In block 415 master communication system 101 switches to a communication mode of operation attempts to communicate with the detected wirelessly chargeable device 110. As can be understood, in some cases, such as a dead cellular phone for example, wirelessly chargeable device 110 may be unable to communicate with master communication system 101. In some other cases, wirelessly chargeable device 110 may be able to communicate with master communication system 101 in a limited manner, and in yet other cases may be able to communicate with master communication system 101 unconditionally.

Furthermore, in certain implementations, upon detecting wirelessly chargeable device 110, master communication system 101 may be placed in a tracking mode of operation in order to keep track of the location of wirelessly chargeable device 110.

Based on the communication mode of operation performed in block 415, master communication system 101 makes a determination in block 420 if wireless power transfer is to be carried out. If no power transfer is to be carried out (based for example on a communication received by master communication system 101 from slave communication system 116), then further power transfer operations are terminated. However, if power transfer is desired, in block 425, wireless power charge transmitter 104 is set to a first power level and a default frequency. In some implementations, the values of the default power level and the default frequency are stored in memory 325 of wireless charger 105 (memory 325 is shown in FIG. 3).

In block 430, wireless power charge transmitter 104 transfers power to wireless power charge receiver 118. In decision block 435 a determination is made whether wirelessly chargeable device 110 is in an activated state. This action is particularly beneficial when it has been determined earlier that wirelessly chargeable device 110 is either in a non-communicable state (a dead device, for example) or is only able to communicate with master communication system 101 in a limited manner.

An activated state may be characterized in several ways. For example, in a first implementation, the activated state may be characterized by establishment of a fully functional bi-directional communication between master communication system 101 and slave communication system 116. In a second implementation, the activated state may be characterized by determining that wirelessly chargeable device 110 has adequate power to provide communication abilities but not enough power to carry out one or more other functionalities of the device, such as for example, having the capacity to provide power to load 121.

If it is determined in block 435 that chargeable device 110 is in not in an activated state, the wireless power charge operation indicated in block 430 is repeated recursively in a loop encompassing blocks 435 and 440. In this example, the charge operation may be referred to as a device activation charge mode of operation. The recursive loop operation may be carried out in certain embodiments by increasing the power level (as shown by dashed block 440), preferably using incremental steps in each loop.

It will be understood that the operations described above with reference to blocks 405 through 435 may be implemented simultaneously upon more than one wirelessly chargeable device. For example, if two wirelessly chargeable devices 110 and 115 are detected in block 410, the actions in blocks 415 through 435 may be carried out upon both devices either concurrently or in a staggered/offset manner. As can be understood, the power transfer between wireless charger 105 and wirelessly chargeable device 110 is carried out between wireless power charge transmitter 104 and wireless power charge receiver 118, while power transfer between wireless charger 105 and wirelessly chargeable device 115 is carried out between wireless power charge transmitter 106 and wireless power charge receiver 126.

When it is determined in block 435 that chargeable device 110 is in an activated state, action proceeds to block 445. In block 445 wireless power charge transmitter 104 is configured to provide a new level of power, at a new frequency. This action may be based on several factors. In one embodiment, this action is carried out based on bi-directional messaging or signaling between master communications system 101 and slave communication system 116. In another embodiment, this action is carried out on the basis of a priority scheme.

To elaborate upon the priority scheme, attention is drawn to FIG. 1, which shows a 1:1 relationship between the number of wireless power charge transmitters and wireless power charge receivers. However, in some implementations, the available number of wireless power charge transmitters may be smaller than the number of wireless power charge receivers that require power transfer. In other words, in place of using a 1:1 ratio, a 1:N ratio (N>1) between the number of wireless power charge transmitters and wireless power charge receivers may be used instead.

When a 1:N ratio is used, a priority scheme may be used to determine which wireless power charge receiver has a higher priority with reference to one or more other receivers. Consequently, in some situations, wireless power charge receiver 118, for example, is placed in a wait state because of a lack of availability of a wireless power charge transmitter. At this time wireless power charge transmitter 104 may be servicing some other chargeable wireless power charge receiver having a higher priority than wireless power charge receiver 118.

The priority scheme may also be employed in certain situations even when a 1:1 relationship exists between the number of wireless power charge transmitters and wireless power charge receivers. Specifically, for example, wireless power charge transmitter 104 may be the most suitable device for charging wirelessly chargeable device 110. However, wireless power charge transmitter 104 contained in wireless charger 105 may be busy servicing some other chargeable wireless power charge receiver having a higher priority than wireless power charge receiver 118 contained in chargeable device 110. Under this condition, a wait state is enforced until wireless power charge transmitter 104 is available to provide power transfer to wireless power charge receiver 118.

Once wireless power charge transmitter 104 is configured to provide a new level of power and new frequency (as shown in block 445), in block 450, wireless charger 105 notifies wirelessly chargeable device 110 of the new frequency. This may be carried out by messaging or signaling operations between master communication system 101 and slave communication system 116 via communication link 108.

In block 455 a determination is made if an acknowledgement indication has been transmitted from slave communication system 116 and received by master communication system 101. If acknowledgement has not been received in master communication system 101, the notification block 450 is recursively applied. As a part of this recursive process, in some implementations, a limitation may be introduced via block 460, whereby a certain number of attempts may be carried out to implement blocks 450 and 455. After the number of attempts has been exceeded, further attempts may be terminated or carried out after a period of time that is periodic, intermittent, or random.

Once acknowledgement has been received, a wireless charge is transmitted from wireless power charge transmitter 104 to wireless power charge receiver 118, as indicated in block 465. This charge may be provided for a predetermined amount of time.

In one exemplary embodiment, as indicated in dashed block 490, the charge is provided to wirelessly chargeable device 110 after disconnecting load 121 from chargeable battery 119. The disconnect operation may be carried out via switch 122 via a control signal provided by controller 117.

After execution of block 465, and as indicated block 470, load 121 is reconnected to chargeable battery 119. In decision block 475, a determination is made via controller 117, for example, to find out if wirelessly chargeable device 110 is in a load supporting state. This determination may be carried out in several different ways. For example, in one case, the voltage present at a node of chargeable battery 119 before and after connection of load 121 to chargeable battery 119 may be monitored in order to measure a voltage drop and to determine if the voltage drop is at an acceptable level that is indicative of the load supporting state. In another case, the load supporting state may be determined by verifying that a device that incorporates chargeable battery 119 is in a fully operational condition, or in yet another case, at least operational enough to provide some basic functions for which the device is designed.

If wirelessly chargeable device 110 is in a load supporting state, the process is terminated. On the other hand, if wirelessly chargeable device 110 is not in a load supporting state, block 480 may be implemented whereby load 121 is disconnected from chargeable battery 119.

In block 485, the second power level that was set in block 445 is increased by an incremental amount. Certain parameters for carrying out this operation (such as power level and duration of increase), may be determined based on communications between master communication system 101 and slave communication system 116.

In block 490, the power transfer may be set to operate at an alternative frequency to that which was used in block 445 and/or wirelessly chargeable device 110 placed in a wait state. The frequency change operation may be carried out on the basis of the priority scheme described above. For example, it may be determined that another wirelessly chargeable device other than wirelessly chargeable device 110 has a higher priority. When this happens, an alternative frequency may be selected for power transfer to wirelessly chargeable device 110, or in some cases, wirelessly chargeable device 110 may be placed in a wait state.

Figure 5A:
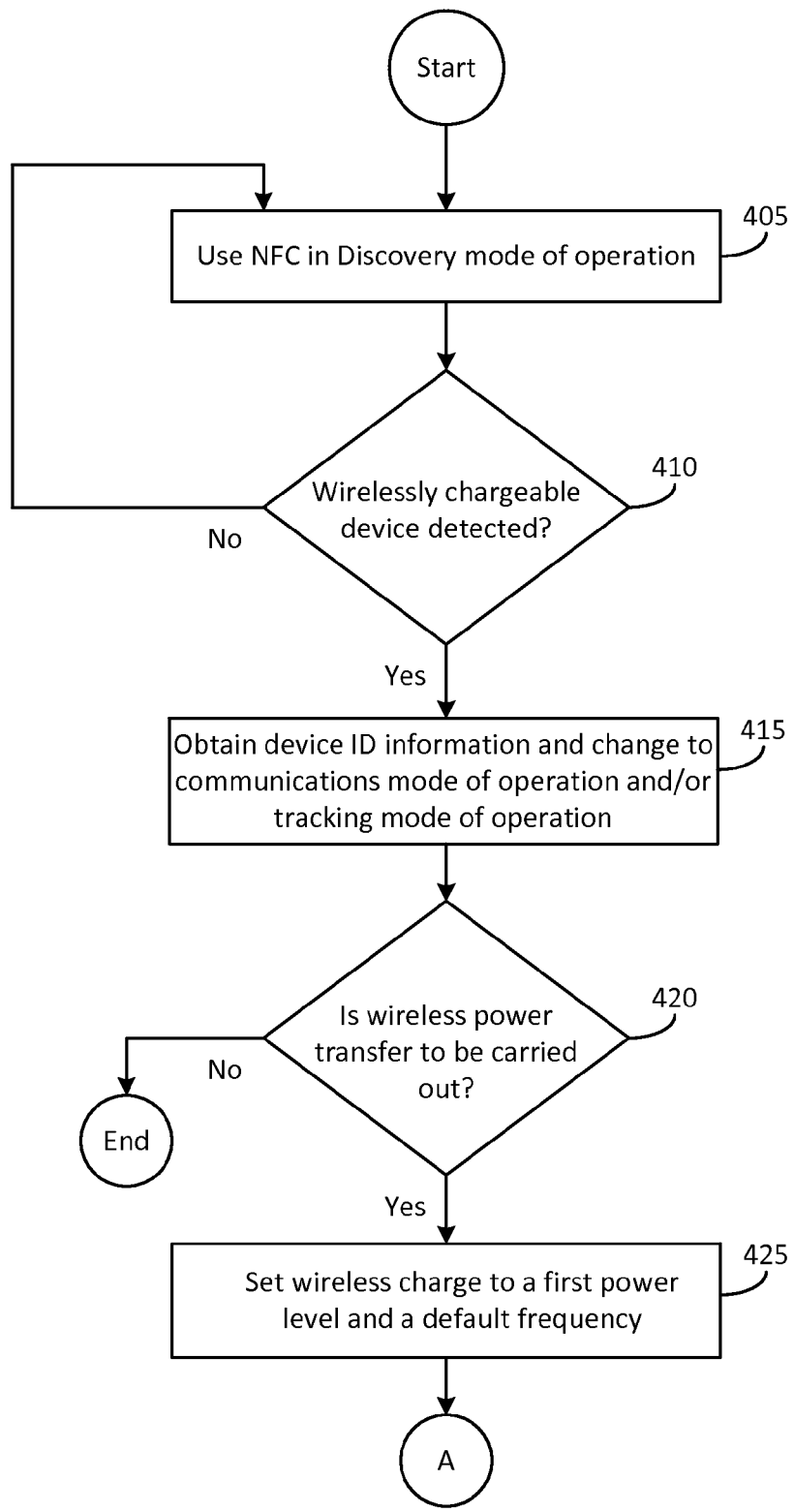
FIGS. 5A, 5B and 5C show a flowchart for a second method for wireless power transfer from a wireless charger to one or more wirelessly chargeable devices
Figure 5B:
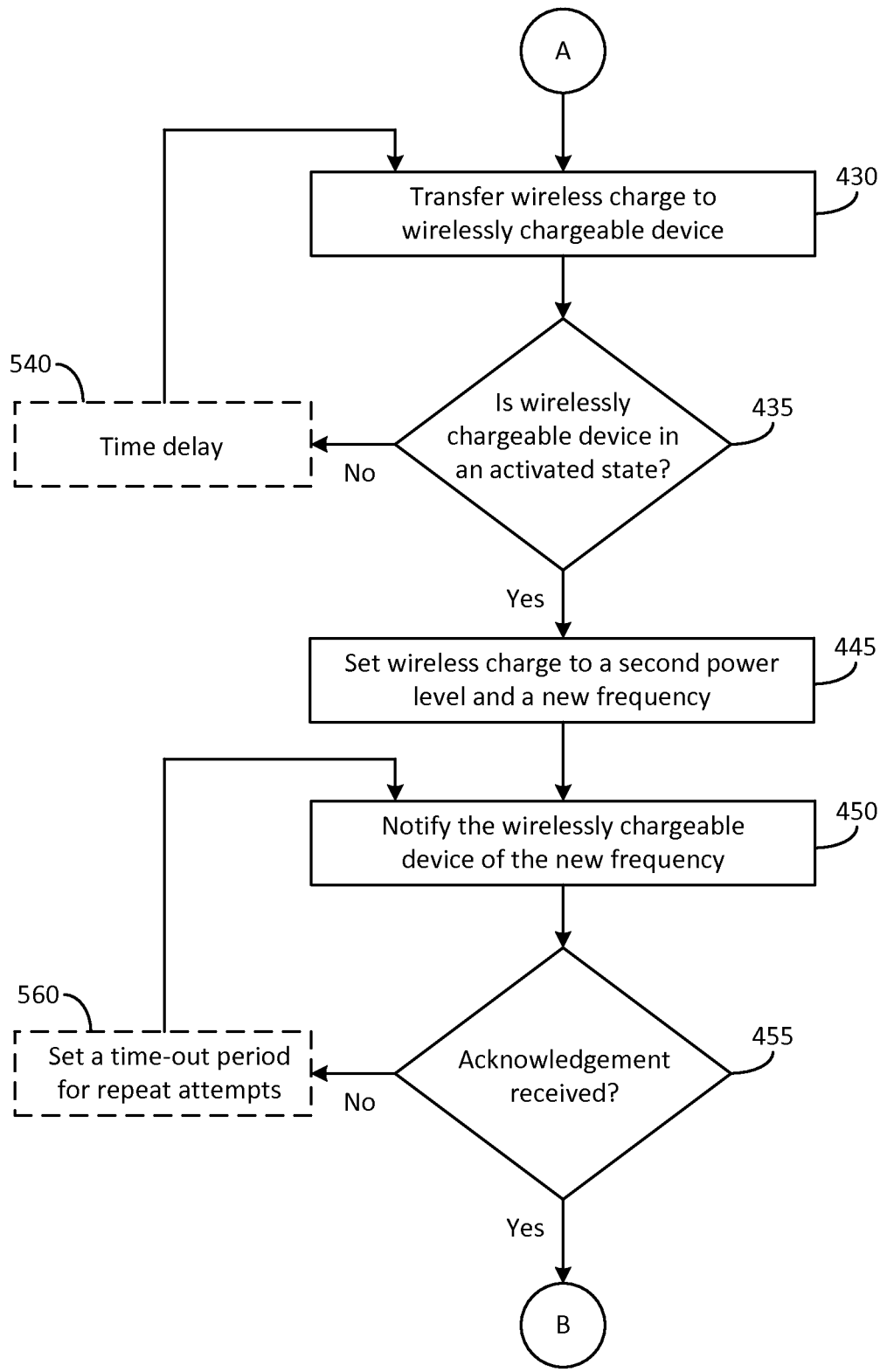
Figure 5C:
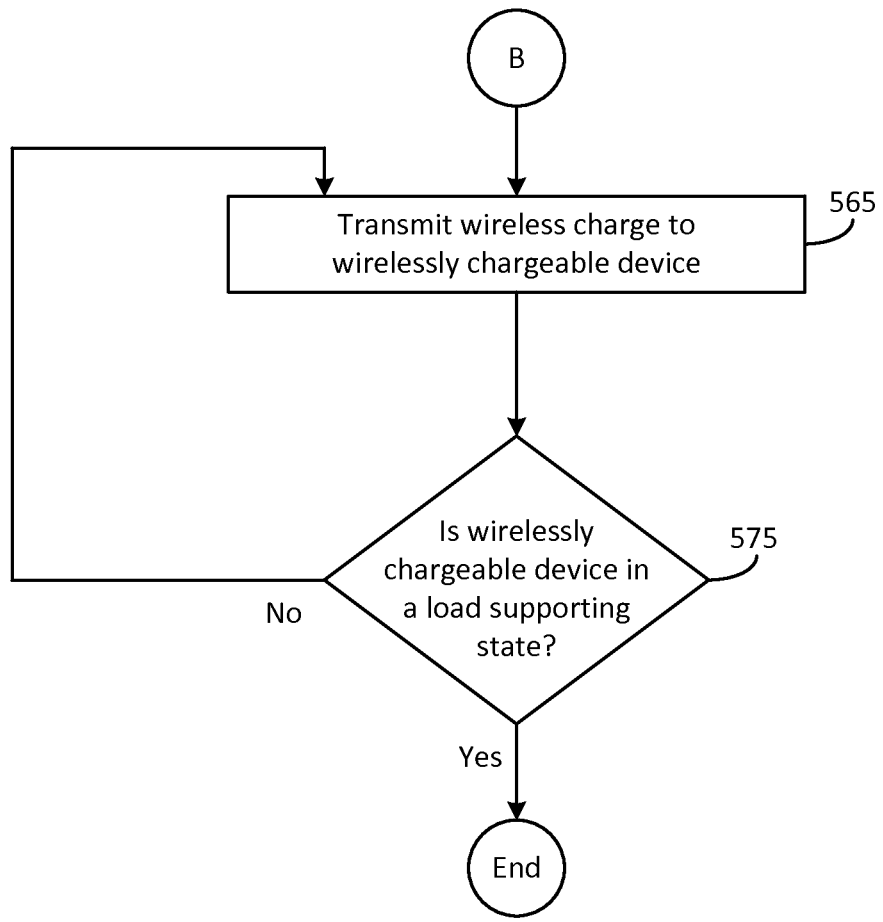

Attention is now drawn to FIGS. 5A-C which show a flowchart for a second method for wireless power transfer from a wireless charger to a wirelessly chargeable device. It may be noted that the operation of several blocks shown in FIGS. 5A-C that are numerically identified in a "4xx" format are similar to those described above with reference to FIGS. 4A-C.

Thus, it will be understood that the operations of the various blocks shown in FIG. 5A are identical to those shown in FIG. 4A. In the interests of brevity, the operations of the various blocks shown in FIG. 5A will not be described herein.

As for FIG. 5B, attention is drawn to block 540, which indicates setting of a time delay before the action shown in block 430 is executed. This operation may be carried out in lieu of the operation of block 440 shown in FIG. 4B, or in addition to the operation of block 440 shown in FIG. 4B.

Block 560 indicates a time-out period that may be set in lieu of, or in addition to, setting the number of attempts as shown in block 460 of FIG. 4B.

In FIG. 5C, the various load connection and disconnection steps shown in FIG. 4C are eliminated and wirelessly chargeable device 110 is provided with a wireless charge (block 565) without disconnecting load 121 from chargeable battery 119. In this exemplary method, the determination in block 575 whether wirelessly chargeable device 110 is in a load supporting state may be carried out in various ways.

For example, various parameters, such as received power level and duration of power transfer may be determined from wireless power charge receiver 118 and/or slave communication system 116 (via communications with master communication system 101). If wirelessly chargeable device 110 is in a load supporting state the process shown in FIG. 5C is terminated. If wirelessly chargeable device 110 is not in a load supporting state, block 565 is implemented recursively in a continuous, intermittent or periodic loop along with block 575. This mode of operation may be referred to as a load supporting charge mode.

The person skilled in the art will appreciate that the description herein is directed at explaining intelligent wireless power transfer between a wireless charger (containing multiple wireless charge transmitters), and multiple wirelessly chargeable devices each containing a communication system that communicates with the wireless charger. Various frequency are used for the power transfer, and the various methods used may incorporate various features such as a priority scheme, a discovery state, a load supporting charge mode, and a device activation charge mode.

While the systems and methods have been described by means of specific embodiments and applications thereof, it is understood that numerous modifications and variations could be made thereto by those skilled in the art without departing from the spirit and scope of the disclosure.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A system comprising:
   a wireless charger, comprising:
      a master wireless communication system;
      a controller;
      a first wireless power charge transmitter that is configurable by the controller to operate in a first charging mode of operation, the first charging mode of operation comprising the use of a first frequency to provide a first charge to a first wirelessly chargeable device, the first wirelessly chargeable device comprising a first slave wireless communication system configured for communicating with the master wireless communication system in the wireless charger, the communicating comprising providing an acknowledgement to the master wireless communication system upon receiving a notification from the master wireless communication system of the first frequency that is to be used for executing the first charging mode of operation; and
      a second wireless power charge transmitter that is configurable by the controller to operate in a second charging mode of operation, the second charging mode of operation comprising the use of a second frequency to provide a second charge to a second wirelessly chargeable device, the second wirelessly chargeable device comprising a second slave wireless communication system configured for communicating with the master wireless communication system in order to execute the second charging mode of operation, wherein the second frequency is different than the first frequency and is selected by the controller to avoid interference between the first charging mode of operation and the second charging mode of operation when the first charging mode of operation is executed simultaneously with the second charging mode of operation.

2. The system of claim 1, wherein at least one of the first or the second wirelessly chargeable devices further comprises:
a passive near field communications (NFC) tag that provides identification information to the master wireless communication system.

3. The system of claim 1, wherein at least one of the first wirelessly chargeable device or the second wirelessly chargeable device comprises a variable frequency wireless power charge receiver, and a corresponding at least one of the first or the second wireless power charge transmitters is a variable frequency wireless power charge transmitter.

4. The system of claim 1, wherein at least one of the first or the second wirelessly chargeable devices further comprises:
a rechargeable battery; and
a switch operable to disconnect the rechargeable battery from a load circuit.

5. A method comprising:
operating a wireless charger in a discovery mode for discovering at least one wirelessly chargeable device;
transitioning from the discovery mode to a device activation charge mode; and
using a default frequency to charge each of a first wirelessly chargeable device and a second wirelessly chargeable device when the wireless charger is operating in the device activation charge mode; the second frequency being different than the first frequency; and
transitioning from the device activation charge mode to a load supporting charge mode;
using a first frequency to charge the first wirelessly chargeable device and a second frequency to charge the second wirelessly chargeable device when the wireless charger is transitioned to the load supporting charge mode; and
swapping the first and second frequencies for charging the first and second wirelessly chargeable devices based on a priority scheme.

6. The method of claim 5, further comprising:
placing at least one of the first or the second wirelessly chargeable devices in a wait state.

7. The method of claim 6, wherein the wait state is based on the priority scheme.

8. The method of claim 5, wherein the device activation charge mode provides an amount of charge to activate the at least one wirelessly chargeable device when the at least one wirelessly chargeable device is a dead device has substantially no charge remaining in a rechargeable battery.

9. The method of claim 5, wherein the device activation charge mode provides an amount of charge to place the at least one wirelessly chargeable device in an activated state, wherein the activated state is characterized by the at least one wirelessly chargeable device having power to communicate with the wireless charger but not enough power to support a load.

10. A method of operating a wireless charger, comprising:
executing a discovery mode of operation to discover a first wirelessly chargeable device;
using a default frequency to provide a first wireless charge to the first wirelessly chargeable device, the power level of the first wireless charge selected for placing the first wirelessly chargeable device in an activated state;
disconnecting a load circuit from the first wirelessly chargeable device when using the default frequency to provide the first wireless charge to the first wirelessly chargeable device;
switching from the default frequency to a first frequency for providing a second wireless charge to the first wirelessly chargeable device, the power level of the second wireless charge selected for enabling the first wirelessly chargeable device to transition from the activated state to a load supporting state;
notifying the first wirelessly chargeable device of the first frequency; and
waiting for an acknowledgement from the first wirelessly chargeable device prior to providing the second wireless charge from the wireless charger to the first wirelessly chargeable device.

11. The method of claim 10, wherein using the discovery mode of operation comprises using passive near field communications (NFC).

12. The method of claim 10, further comprising:
using the default frequency to provide the first wireless charge to a second wirelessly chargeable device for placing the second wirelessly chargeable device in an activated state.

13. The method of claim 12, wherein using the default frequency to provide the first wireless charge to the second wirelessly chargeable device is performed substantially concurrent to using the default frequency to provide the first wireless charge to the first wirelessly chargeable device.

14. The method of claim 12, further comprising:
switching from the default frequency to a second frequency for providing a third wireless charge to the second wirelessly chargeable device, the second frequency different than the first frequency.

* * * * *